US012071015B2

(12) United States Patent
Martin

(10) Patent No.: US 12,071,015 B2
(45) Date of Patent: Aug. 27, 2024

(54) COMBINED MOTOR AND COMPRESSOR MOUNT FOR LIFT TRUCK

(71) Applicant: James C. Martin, Westlake, OH (US)

(72) Inventor: James C. Martin, Westlake, OH (US)

(73) Assignee: MARTIN SHEET METAL, INC., Cleveland, OH (US)

( * ) Notice: Subject to any disclaimer, the term of this patent is extended or adjusted under 35 U.S.C. 154(b) by 0 days.

(21) Appl. No.: 18/145,039

(22) Filed: Dec. 22, 2022

(65) Prior Publication Data

US 2024/0208320 A1   Jun. 27, 2024

(51) Int. Cl.
| | |
|---|---|
| *B60K 5/12* | (2006.01) |
| *B66F 9/075* | (2006.01) |
| *F16M 13/02* | (2006.01) |

(52) U.S. Cl.
CPC ............ *B60K 5/12* (2013.01); *B66F 9/07595* (2013.01); *F16M 13/02* (2013.01)

(58) Field of Classification Search
CPC .......... B60K 5/12; B66F 9/0795; F16M 13/02
See application file for complete search history.

(56) References Cited

U.S. PATENT DOCUMENTS

| | | | | |
|---|---|---|---|---|
| 1,743,612 | A * | 1/1930 | Lee .......................... | B60K 5/12 180/291 |
| 3,773,132 | A * | 11/1973 | Gawlik .................... | B60K 1/00 180/908 |
| 4,593,786 | A * | 6/1986 | Tate ........................ | B60L 50/66 123/196 AB |
| 6,976,554 | B2 * | 12/2005 | Tsuruda ................... | F01L 1/022 180/312 |
| 8,926,726 | B2 * | 1/2015 | Mitsuda ................... | F01N 13/00 422/177 |
| 9,739,188 | B2 * | 8/2017 | Fukuyoshi ............... | F01N 3/021 |
| 10,071,772 | B2 * | 9/2018 | Sasaki ..................... | B62D 21/11 |
| 10,118,649 | B2 * | 11/2018 | Isakiewitsch ........ | B62D 25/085 |
| 10,625,590 | B1 * | 4/2020 | Kumar ..................... | B60K 5/12 |
| 11,078,823 | B1 * | 8/2021 | Sciacca .................... | B60K 5/12 |
| 11,279,407 | B2 * | 3/2022 | Viereck .................... | B60K 1/00 |

(Continued)

FOREIGN PATENT DOCUMENTS

| | | |
|---|---|---|
| CN | 201520624 U | 7/2010 |
| CN | 203383902 U | 1/2014 |

(Continued)

OTHER PUBLICATIONS

European Search Report dated May 16, 2024 for corresponding EP Application No. 23218133.

*Primary Examiner* — Eret C McNichols
(74) *Attorney, Agent, or Firm* — Pearne & Gordon LLP

(57) ABSTRACT

A bracket for mounting on the engine of a lift truck, the bracket having a plate to be bolted to the side of the block with bolts through holes in the plate configured to be aligned with threaded holes on the side of the engine block, at least one extension from the plate to a foot with an aperture, the aperture being arranged to receive the bolt associated with an elastomeric motor mount, the foot having an extension forwardly of the engine block, the foot extension having surfaces, supported by said at least one extension, in a plane perpendicular to the crankshaft of the engine, the surfaces having apertures for receiving bolts that align with mounting holes on a housing of the compressor.

4 Claims, 2 Drawing Sheets

(56) References Cited

U.S. PATENT DOCUMENTS

| | | | | |
|---|---|---|---|---|
| 11,529,870 B2 * | 12/2022 | Jung | ....................... | F16F 15/08 |
| 2011/0167808 A1 * | 7/2011 | Kosaka | ............... | F01N 13/1822 |
| | | | | 60/272 |
| 2015/0152764 A1 * | 6/2015 | Fukuyoshi | ................ | F01N 3/10 |
| | | | | 60/298 |
| 2016/0061086 A1 * | 3/2016 | Shiomi | ............... | F02D 41/0245 |
| | | | | 60/311 |
| 2016/0096426 A1 * | 4/2016 | Kurokawa | .............. | F01N 3/021 |
| | | | | 180/309 |
| 2017/0057550 A1 * | 3/2017 | Sasaki | .................... | B62D 21/11 |
| 2024/0059113 A1 * | 2/2024 | Raetzman | .............. | B60G 7/008 |

FOREIGN PATENT DOCUMENTS

| | | | | |
|---|---|---|---|---|
| CN | 107956579 A | | 4/2018 | |
| CN | 110131133 A | | 8/2019 | |
| DE | 102021002635 A1 * | | 12/2021 | ............... F16M 1/08 |
| FR | 2980742 A3 * | | 4/2013 | ............... B60K 5/12 |
| FR | 3038265 A1 * | | 1/2017 | ............... B60K 5/12 |
| GB | 2598990 A * | | 3/2022 | ............. B60K 17/00 |

\* cited by examiner

COMBINED MOTOR AND COMPRESSOR MOUNT FOR LIFT TRUCK

BACKGROUND OF THE INVENTION

The invention provides a mount for an air conditioner compressor for a lift truck.

PRIOR ART

Lift trucks are typically manufactured without cabs that would otherwise protect the operator from atmospheric conditions such as extreme sold or heat. Without enclosed cabs, there has been no reason for lift truck manufacturers to provide air conditioning. Certain users, particularly users of a large number of trucks, are requesting that lift truck manufacturers provide air conditioned cabs.

Traditional air conditioning systems, such as provided in automotive applications, use a refrigerant compressor mechanically driven by the vehicle motor. Since lift trucks are not ordinarily manufactured with air conditioning systems, their engines are not provided with compressor mounting features. This circumstance presents a need for a practical mounting arrangement for a compressor on a conventional lift truck engine. Ideally, the compressor mount should not require machining or other modification of an existing engine.

SUMMARY OF THE INVENTION

The invention provides a bolt on multiplate bracket that works with an elastomeric motor mount and provides surfaces that align a compressor with its axis parallel to the motor crankshaft. As disclosed, the bracket is a one-piece steel weldment. One part of the bracket has mounting holes that align with original blind threaded holes in the engine block provided by the engine manufacturers for engine mounting purposes. Rigidly affixed to the engine mounting part of the bracket are surface elements that mate with mounting provisions on the compressor. As disclosed, the inventive bracket is capable of exclusively supporting the compressor.

The disclosed compressor is driven by a serpentine or multi-groove belt wrapped around a drive pulley on an end of the crankshaft. The inventive bracket includes mounting centers for idler pulleys located to guide the belt around more than 180 degrees of the compressor pulley.

DESCRIPTION OF THE PREFERRED EMBODIMENTS

Figure 1:
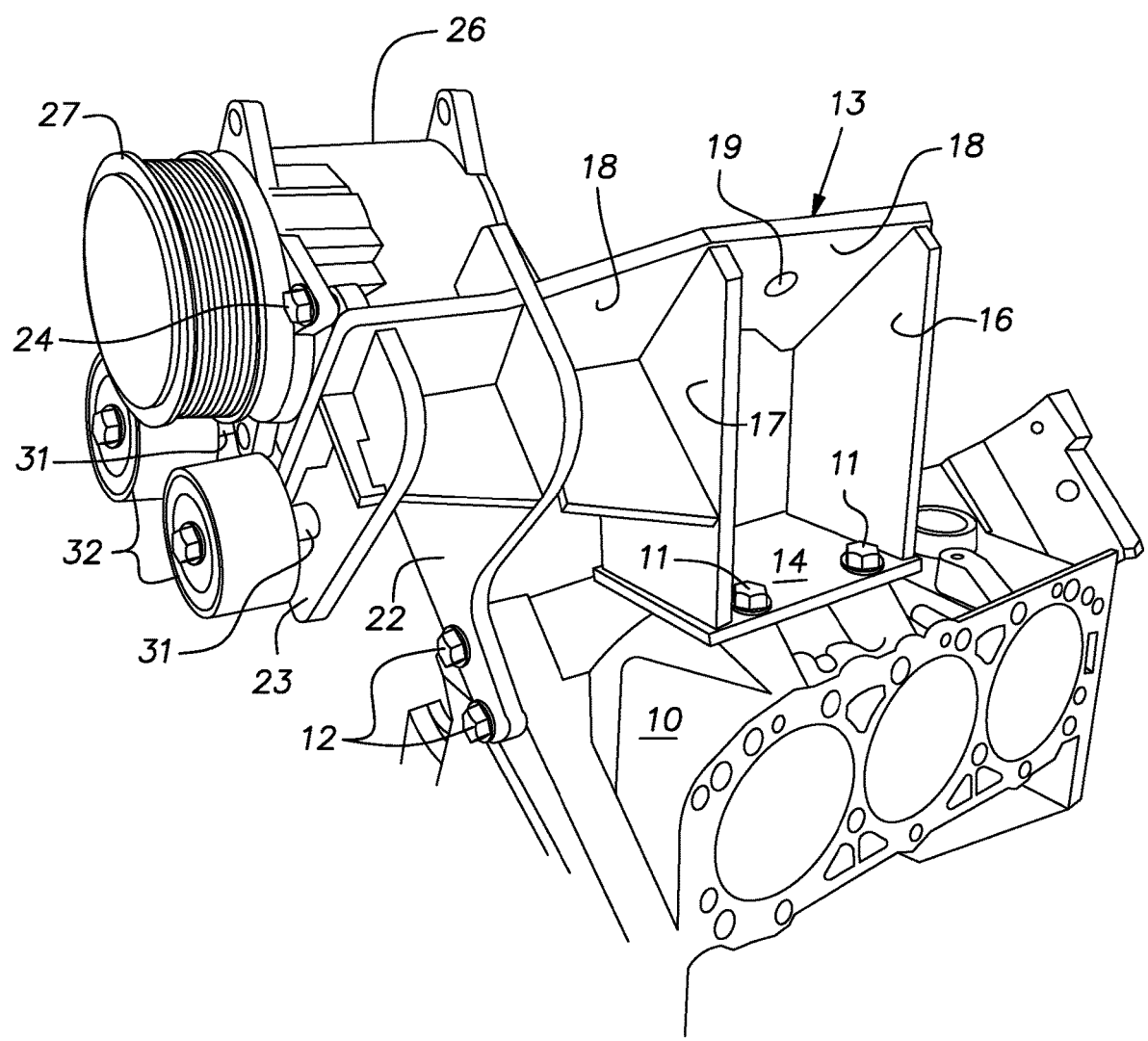
FIG. 1 is a top perspective view of the bracket.
Figure 2:
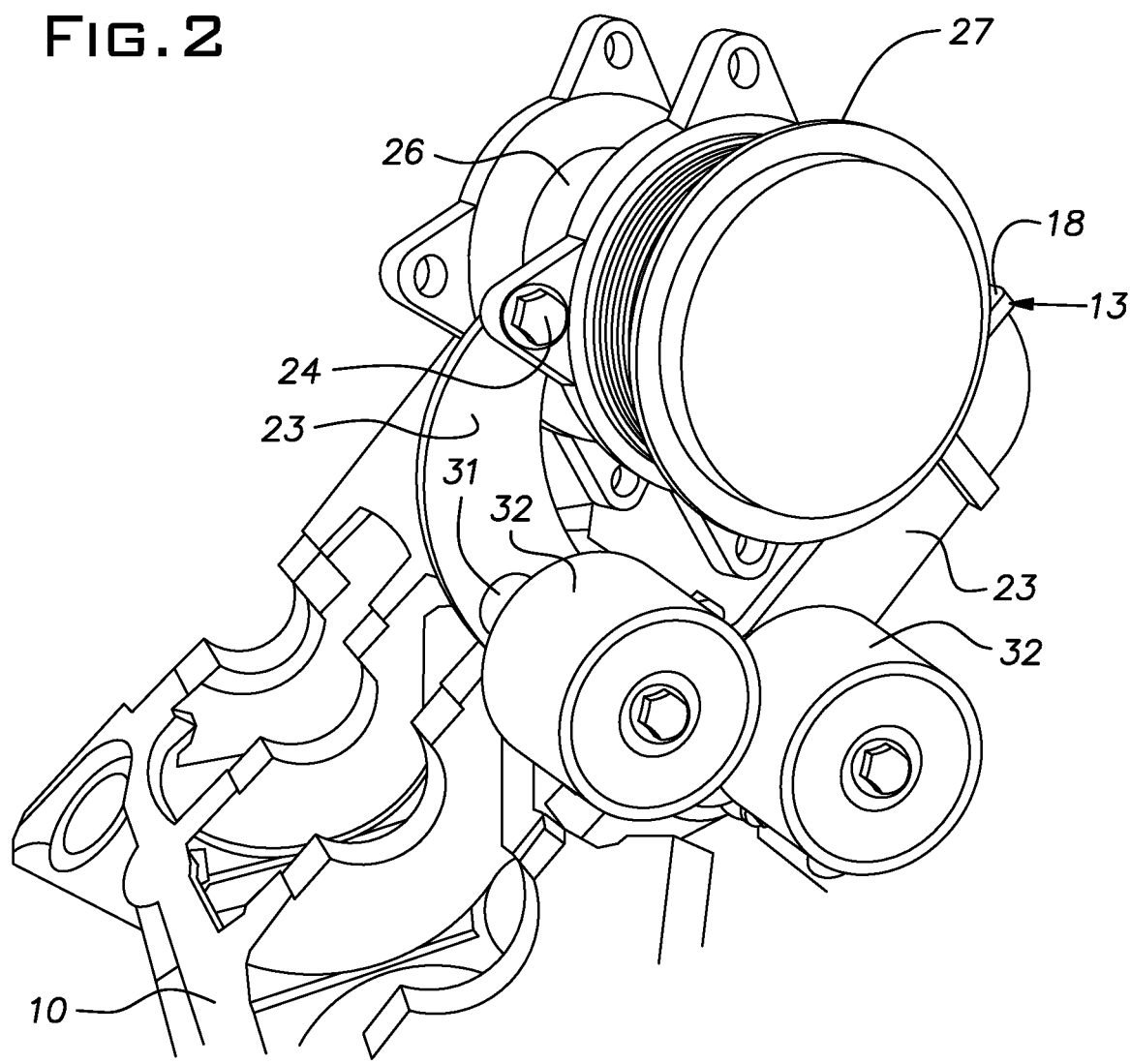
FIG. 2 is a bottom perspective view of the bracket.

FIG. 1 shows the right side, with reference to an operator, of a lift truck engine block. The illustrated engine is used in Mitsubishi manufactured Caterpillar lift trucks of series GC35K to 55K. The engine block 10 on the right side is manufactured with a plurality of 3 internally threaded bosses that receive bolts 11, two of which are seen in FIG. 1. Similarly, at a front of the engine 10 are two internally threaded bosses that receive bolts 12.

A combined motor mount and refrigerant compressor mount bracket 13 is fixed to the engine block 10 with the bolts 11, 12 received through holes in the bracket. The illustrated bracket 13 is fabricated as a steel weldment but can be a steel or other suitable metal casting. Various plates of the bracket 13 can be ⅜ inch thick. A base plate 14 of the bracket abuts the block 10 and has holes aligned with internally threaded bosses for reception of suitable bolts 11.

Two plates 16, 17 projecting from the plate 14 extend to an angled plate 18. The angled plate 18 has an aperture 19 to receive a central bolt of a conventional elastomeric motor mount. Elastomeric pads of the motor mount are assembled, one at each face of the angle plate 18, as is conventional. A lower one of the pads engages a part of the frame of the lift truck to bear the weight of the engine and torque forces.

The plate 18, in the illustrated design, extends to a location forward of the engine block 10. The plate 18 is stiffened with welded gussets 22, 23. One of the gussets 22 extends to the front of the engine block 10 where it is secured with the bolts 12.

Two parallel gussets 22, 23, in planes perpendicular to the motor crankshaft, extend to a far side of the plate 18 and provide surfaces and threaded holes for receiving mounting flanges of a compressor 26 and corresponding bolts 24. Surfaces of the gussets 22, 23 align the compressor pulley 27 with a crankshaft pulley so that they are in a common plane. Central holes in cylindrical bosses 31 on the frontward gusset 23 provide mounting centers for idler pulleys 32 that guide a serpentine belt around at least ½ of the compressor pulley circumference.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A bracket for mounting on an engine of a lift truck, the bracket having a plate to be bolted to a side of an engine block with bolts through holes in the plate configured to be aligned with threaded holes on the side of the engine block, at least one extension on and from the plate to a foot with an aperture, the aperture being arranged to receive a bolt associated with an elastomeric motor mount, the foot having an extension fixed thereto and extending forwardly of the engine block, the foot extension having surfaces, supported by said at least one extension, the surfaces having apertures for receiving bolts that align with mounting holes on a housing of a compressor.

2. A bracket as set forth in claim 1, wherein a mounting element rigid with the plate includes holes for receiving mounting bolts at a front of the engine block.

3. A bracket as set forth in claim 1, wherein said at least one extension and another extension are situated and fixed at opposite ends of the plate.

4. A bracket as set forth in claim 1, wherein said at least one extension is in a generally vertical plane when the plate is bolted to the engine block side and the engine is in an operational orientation.

* * * * *